(12) United States Patent  
Hall

(10) Patent No.: US 9,346,110 B2  
(45) Date of Patent: May 24, 2016

(54) INDEXABLE CUTTING INSERT FOR A SIDE MILLING CUTTER

(75) Inventor: Arndt Hall, Weisendorf (DE)

(73) Assignee: KENNAMETAL INC., Latrobe, PA (US)

( * ) Notice: Subject to any disclaimer, the term of this patent is extended or adjusted under 35 U.S.C. 154(b) by 678 days.

(21) Appl. No.: 13/174,894

(22) Filed: Jul. 1, 2011

(65) Prior Publication Data

US 2012/0014758 A1 Jan. 19, 2012

(30) Foreign Application Priority Data

Jul. 15, 2010 (DE) .......................... 10 2010 027 413

(51) Int. Cl.
 *B23C 5/22* (2006.01)
 *B23C 5/08* (2006.01)

(52) U.S. Cl.
 CPC ............... *B23C 5/2269* (2013.01); *B23C 5/08* (2013.01); *B23C 2200/081* (2013.01); *B23C 2200/086* (2013.01); *B23C 2200/161* (2013.01); *B23C 2200/165* (2013.01); *B23C 2210/168* (2013.01); *B23C 2210/66* (2013.01); *Y10T 407/1926* (2015.01); *Y10T 407/2208* (2015.01); *Y10T 407/2272* (2015.01); *Y10T 407/23* (2015.01)

(58) Field of Classification Search
 USPC ........................... 407/33, 41, 42, 49, 108, 113
 See application file for complete search history.

(56) References Cited

U.S. PATENT DOCUMENTS

| | | | |
|---|---|---|---|
| 447,900 A * | 3/1891 | Pallen | 407/45 |
| 1,938,616 A | 12/1933 | Alpen | |
| 1,938,717 A | 12/1933 | Oxford | |
| 1,938,718 A | 12/1933 | Oxford et al. | |
| 2,042,081 A * | 5/1936 | Van Deusen et al. | 407/39 |
| 2,173,868 A | 9/1939 | Weddell et al. | |
| 2,805,468 A * | 9/1957 | Williams | B23C 5/2455 407/41 |
| 4,357,122 A * | 11/1982 | Hollis et al. | 407/42 |
| 6,884,008 B2 * | 4/2005 | Minshall | 407/113 |
| 7,780,381 B2 * | 8/2010 | Sjoo et al. | 407/113 |
| 7,794,182 B2 * | 9/2010 | Lehto et al. | 407/35 |
| 2005/0135884 A1* | 6/2005 | Lundvall | 407/113 |
| 2011/0044774 A1* | 2/2011 | Gustavsson | 407/36 |

FOREIGN PATENT DOCUMENTS

| | | |
|---|---|---|
| DE | 21 61 233 A1 | 8/1972 |
| EP | 1 524 051 A2 | 4/2005 |
| FR | 78 22 007 | 7/1978 |
| JP | 2004209615 A * | 7/2004 |
| WO | 2006/002906 A1 | 1/2006 |
| WO | 2009/0113941 A1 | 9/2009 |

* cited by examiner

*Primary Examiner* — Sunil K Singh
*Assistant Examiner* — Alan Snyder
(74) *Attorney, Agent, or Firm* — Larry R. Meenan

(57) ABSTRACT

An indexable cutting insert (1) for a side milling cutter (11) includes two insert surfaces facing away from each other. Both insert surfaces include a relief-like profile (6).

1 Claim, 8 Drawing Sheets

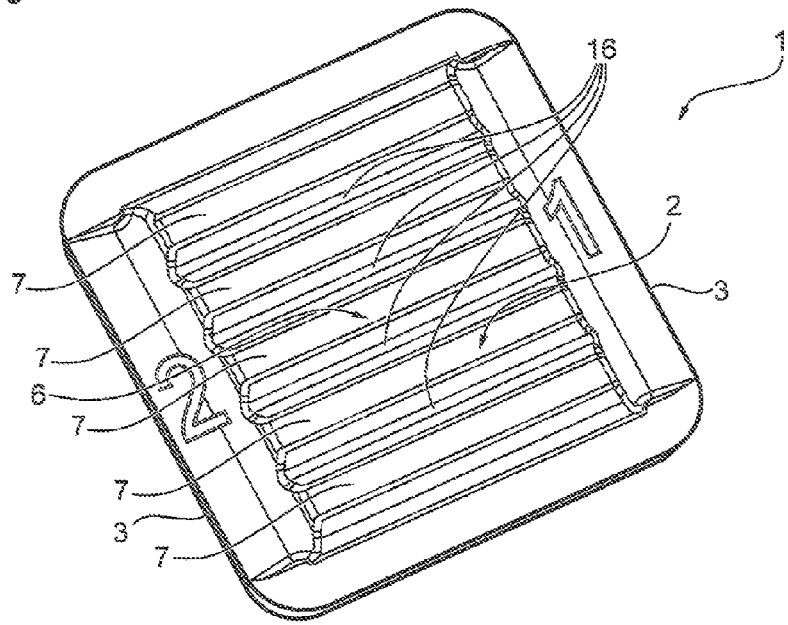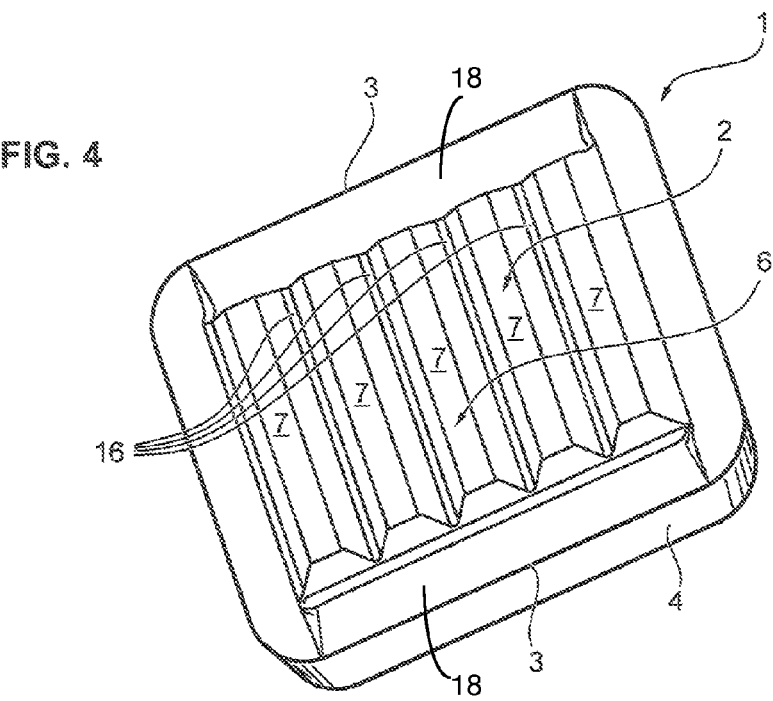

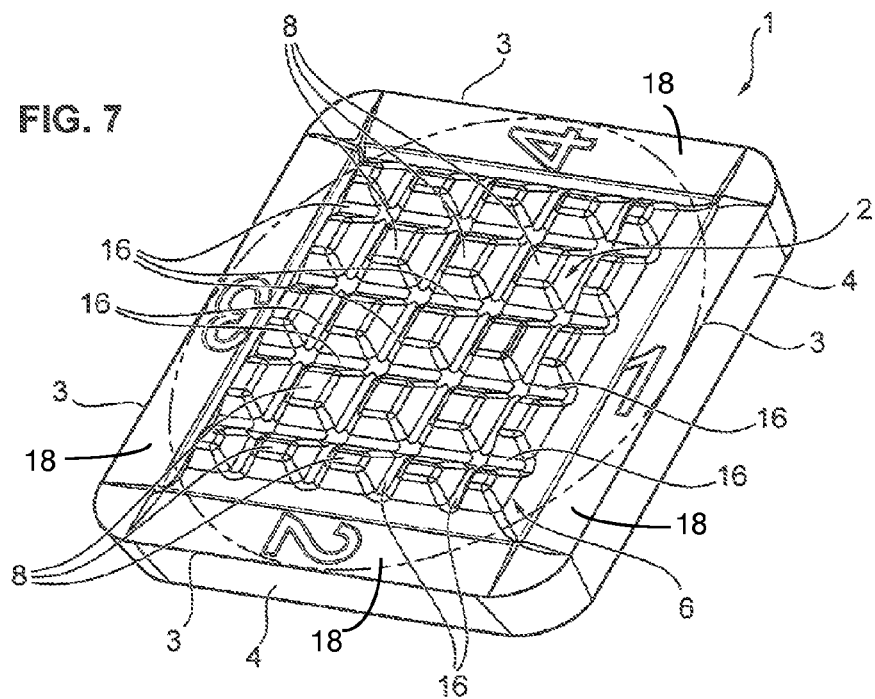
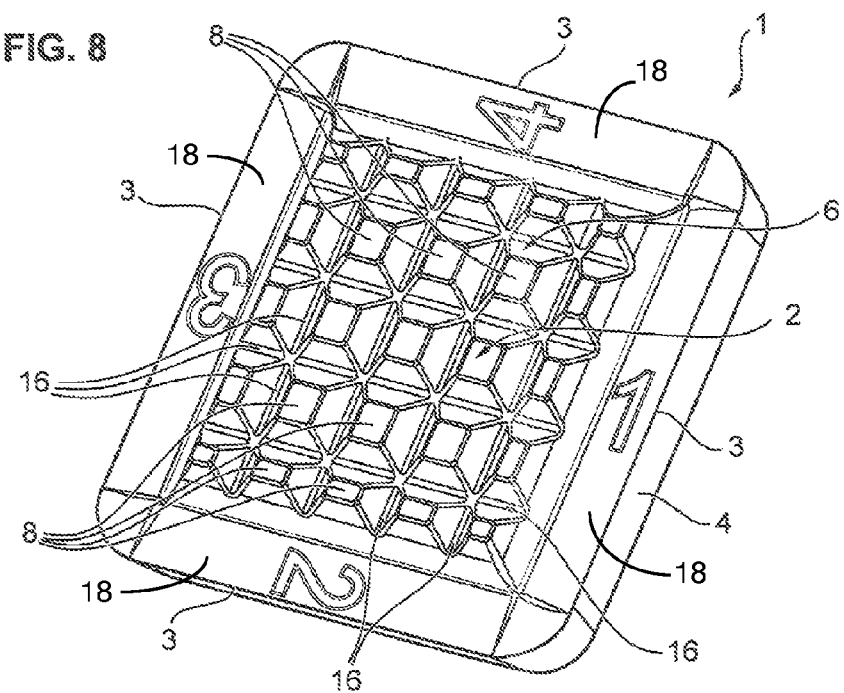

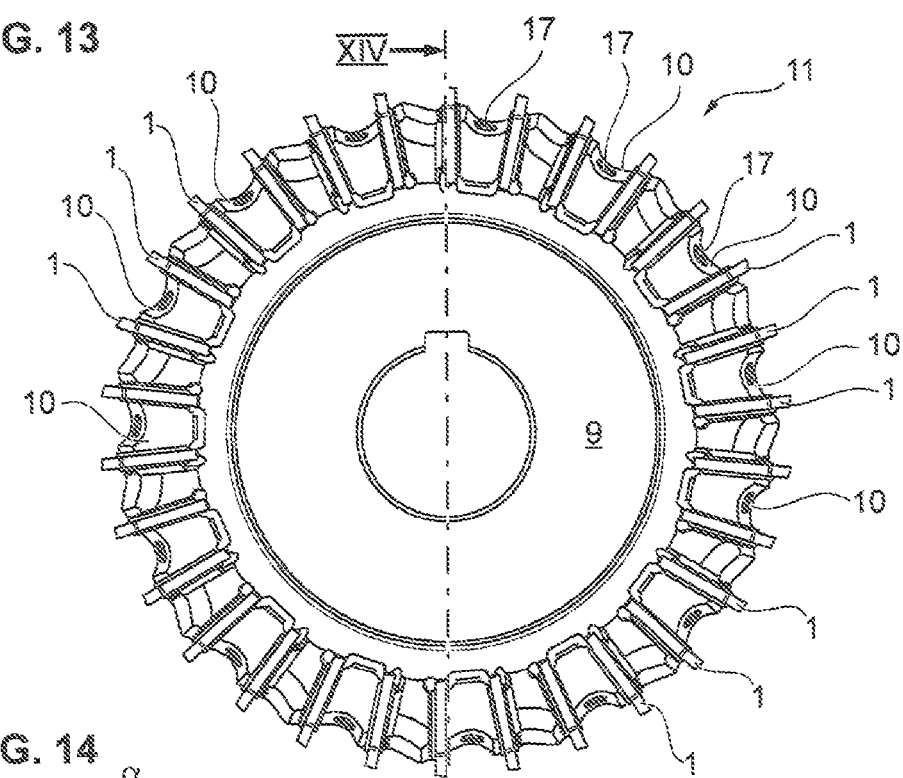
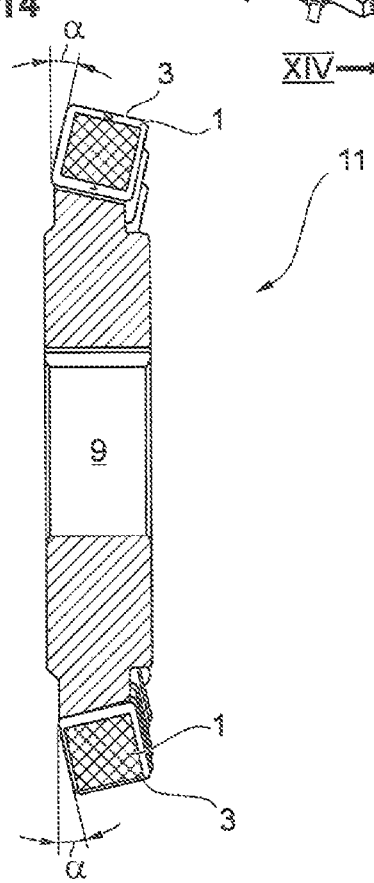

INDEXABLE CUTTING INSERT FOR A SIDE MILLING CUTTER

BACKGROUND OF THE INVENTION

1. Field of the Invention

The invention relates to an indexable cutting insert as a replaceable cutting tool for a side milling cutter. In addition, the invention relates to an insert seat for an indexable cutting insert of this type and to a side milling cutter adapted thereto.

2. Description of Related Art

In the case of these types of milling cutters, the cutting tools and consequently the cutting edges are arranged on the periphery of a disk-shaped support body. On account of this geometry, such cutting tools can be used, for example, in the production of crankshafts by means of peripheral circular milling and for the incorporation of straight or helical grooves in workpieces, in particular for the production of worms for worm drives, extrusion machines or deep hole drills.

An important objective when designing a replaceable indexable cutting insert and a support body is to develop the detachable connection between indexable cutting insert and support body so that it is both simple to handle and capable of resisting wear brought about by forces acting on it.

The publication WO 2006/002906, provided by the Applicant, makes known a support body which has several receiving pockets on the periphery. In the region of the two pocket flanks of each of the receiving pockets, which define said pockets in the peripheral direction, there is provided, in each case, one contact contour in which an indexable cutting insert with integrally molded contact shoulder is inserted in a substantially form-fitting manner. A clamping wedge, which is fixed on the support body by means of a screw and holds the indexable cutting inserts in a force-fitting manner in the receiving pocket, is inserted between the two indexable cutting inserts of one receiving pocket. Compared to alternative fastening possibilities, this concept enables, in an advantageous manner, a large number of cutting tools, and consequently a large number of cutting edges, to be distributed on a pre-determined periphery of a disk-shaped support body. However, compensation of forces acting axially and consequently vertically in relation to the clamping forces is only possible in a very limited manner.

SUMMARY OF THE INVENTION

Proceeding from this point, it is the object of the invention to improve further the afore-described fastening system and to design an indexable cutting insert and, as a result, a side milling cutter which are particularly suitable for production processes, while the axial forces thereof act on the indexable cutting inserts of the side milling cutter.

An indexable cutting insert corresponding to the teaching of said invention is provided for a side milling cutter and has a relief-like profile on each of the two insert surfaces that face away from each other. The profile, in this case, can both be designed as a contiguous individual element and be constructed from several part elements which are spatially separated from each other and distributed over the insert surface. Depending on the way it is looked at, the profile either protrudes out of the base surface or, if looked at in a reverse manner, is incorporated into a base surface. At least one profile of an indexable cutting insert engages, when in use, in a counter profile provided for this purpose on the disk-shaped support body. This interlocking between profile and counter profile enables an axial transmission of force between indexable cutting insert and support body. Therefore, if axial forces act on the indexable cutting insert during milling, said indexable cutting insert is then held in its position relative to the support body by corresponding counter forces transmitted via the profiles.

As claimed in a preferred embodiment, a square basic form is provided for the indexable cutting insert and an inherent clearance angle >0°, which in specialist literature this is referred to as a positive cutting insert. As a result, up to four cutting edges of the same kind can be incorporated in the basic form and can be used one after the other by rotating the indexable cutting insert. To this end, the profile of the indexable cutting insert has to have a symmetry that matches this such that said profile, in all provided rotational positions, engages in a functionally true manner in the counter profile that is positionally rigid in relation to the support body.

A restriction to only two cutting edges is deemed to be advantageous if a special form of the cutting edge geometry is to be realized. In this case, a rectangular basic form of the indexable cutting insert and biaxial symmetry of the profile are sufficient. A very expedient profile, as it is easy to realize, with biaxial symmetry is formed by several parallel gripping strips.

In the case of embodiments with four cutting edges, an arrangement of profile elements in the manner of a chess board ensures the necessary four-axial symmetry. A form of the profile elements in the manner of a cube or a truncated pyramid is preferred here. In this case, this is, as it were, a profile produced from gripping strips adapted to the four-axial symmetry, where additional transversely-extending intermediate spaces have been created in a corresponding manner.

In this context, it is seen as advantageous over and above this if the intermediate spaces or recesses between the gripping strips or the profile elements are designed in a V-shaped manner. That V-shaped or funnel shape simplifies the interlocking between profile and counter profile and thus facilitates the assembly of the indexable cutting insert on the support body.

In addition, it is advantageous to develop the end face of the profile, which consists of the remaining faces of the machined base surface, such that it produces a level contact surface. This serves, for example, as a clamping surface corresponding to the face side or the back surface according to the afore-mentioned publication WO 2006/002906, as a result of which the indexable cutting insert can also be used for support bodies without a counter profile. Only one indexable cutting insert variant has thus to be produced for both support body variants.

In addition to the profile of an indexable cutting insert as claimed in the invention, a disk-shaped support body as claimed in the invention has, on a guide surface which is part of an insert seat for an indexable cutting insert, a counter profile in which the profile of the indexable cutting insert engages preferably in a form-fitting manner when in use.

In this case, in a preferred version of the embodiment, the counter profile is constructed from V-shaped, parallel-extending tooth strips such that said counter profile is suitable both as counterpart to a profile produced from parallel gripping strips and as a counterpart to a chess-board-like profile with cube-like or truncated-pyramid-like profile elements.

It is particularly expedient in this context to align the tooth strips and, as a result, also the gripping strips or the rows of profile elements arranged in the manner of a chess board such that they are oriented perpendicular to the axial direction, as this means that the intended force transmission between indexable cutting insert and support body in the axial direction is carried out in a particularly effective manner.

The insert seats can both extend in the axial direction of the side milling cutter and be inclined by a cutting angle α in relation to the axial direction of the side milling cutter. The inclined position brings about an increase in the axial forces. It is also possible to incline the insert seats in each case in an alternating manner toward both sides of the side milling cutter. In the case of an inclined insert seat, the counter profile, developed preferably in the form of tooth strips, is pivoted with the insert seat such that the counter profile is no longer oriented at right angles to the axial direction of the side milling cutter, but the right-angled orientation refers solely to the insert seat which, in its turn, is inclined by the cutting angle α in relation to the side milling cutter.

Additionally advantageous is an embodiment where several same-type receiving pockets are arranged on the periphery in the manner of an equal distribution and are incorporated radially into the support body. The two pocket flanks, which define a receiving pocket in the peripheral direction, act here, in each case, as guiding surfaces and are accordingly, in each case, provided with a counter profile. A profile of an indexable cutting insert engages in each counter profile, as a result of which a paired arrangement of the indexable cutting inserts is produced in the case of the side milling cutter as claimed in the invention. In the final assembly state, a double clamping wedge, which is fixed by way of a screw on the support body and has two preferably profile-free clamping surfaces which face away from each other, is incorporated between the two indexable cutting inserts of one cutting insert pair to clamp the two indexable cutting inserts in the receiving pocket. This paired arrangement of the indexable cutting inserts with a profile-free double clamping wedge lying in between creates a certain flexibility, on account of which the side milling cutter is able to deform in the region of the cutting tools. The clamping surfaces and the insert surfaces abutting against the same are therefore not rigidly interconnected such that locally occurring load peaks can be reduced here by means of sliding friction.

To sum up, a side milling cutter consequently has a plurality of receiving pockets arranged distributed over its periphery. The receiving pockets serve, in their turn, in each case for receiving two indexable cutting inserts. When looking at the side milling cutter in the axial direction, a right-hand and a left-hand side wall of each receiving pocket form in each case an insert seat for an indexable cutting insert. On account of the profile provided on both sides of each indexable cutting insert it is thus possible to arrange one and the same indexable cutting insert both in a right-hand arrangement on the, in each case, right-hand side wall and in a left-hand arrangement on the, in each case, left-hand side wall at the same time. The level development of the end face of the profile makes it possible additionally to fix, in each case, two indexable cutting inserts arranged in one receiving pocket by means of a double clamping part. The large number of cutting tools striven for can be mounted on the side milling cutter in this way.

It is provided in a further embodiment, to arrange the indexable cutting inserts of one cutting insert pair or the cutting insert pairs in an alternating manner offset to each other in the axial direction. This means that it is possible to vary the cutting width of the side milling cutter without additional components corresponding to the width of the offset.

BRIEF DESCRIPTION OF THE DRAWINGS

The invention is described further by way of the exemplary embodiment, in which:

FIG. 3 shows a perspective view of an indexable cutting insert as claimed in the invention with a palisade-like profile, FIG. 4 shows a perspective view of an indexable cutting insert as claimed in the invention with a palisade-like profile, FIG. 7 shows a perspective view of an indexable cutting insert as claimed in the invention with a checkered profile produced by truncated pyramids, FIG. 8 shows a perspective view of an indexable cutting insert as claimed in the invention with a checkered profile produced by truncated pyramids, FIG. 13 shows a side view of a side milling cutter as claimed in the invention with inserted indexable cutting inserts and double clamping wedges, FIG. 14 shows the cross section XIV-XIV in FIG. 13 of a side milling cutter as claimed in the invention with inserted indexable cutting inserts and double clamping wedges.

Parts that correspond to each other are provided with identical references in all the Fig.s.

DETAILED DESCRIPTION OF THE INVENTION

Figure 1:
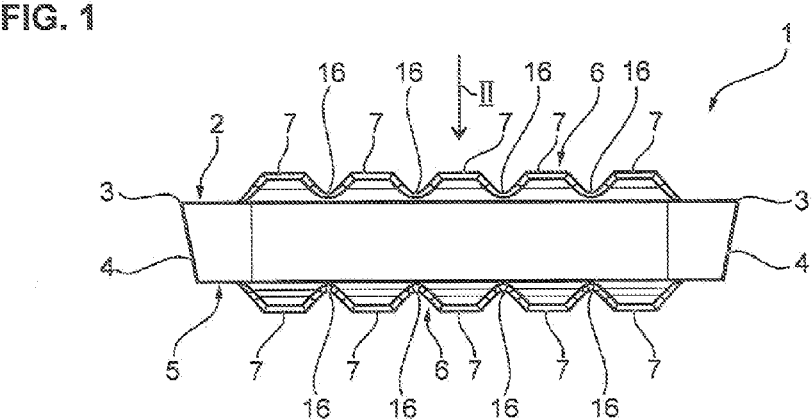
FIG. 1 shows a side view of an indexable cutting insert as claimed in the invention with a palisade-like profile.
Figure 2:
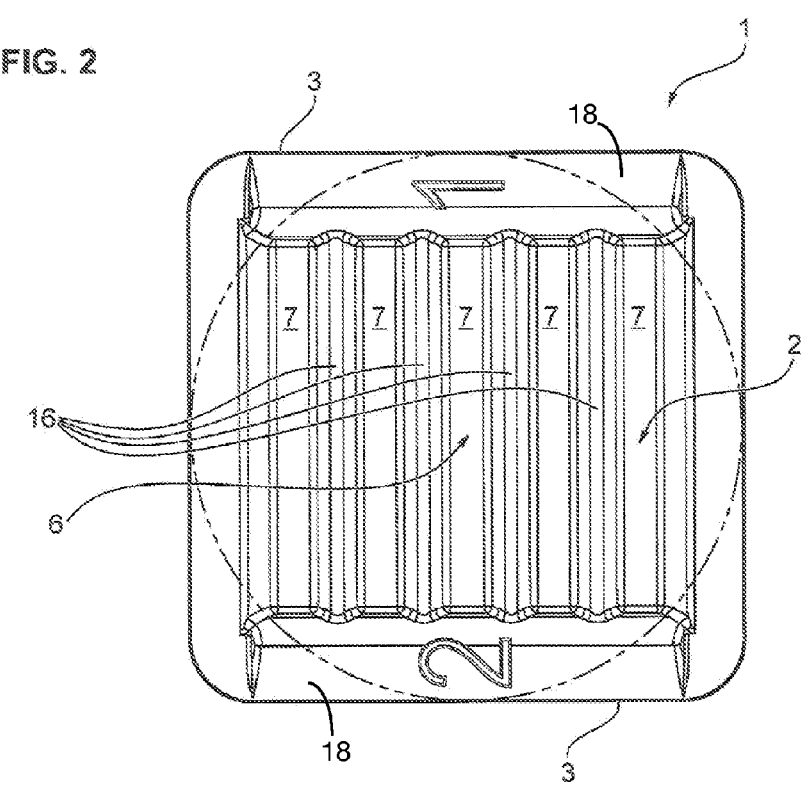
FIG. 2 shows a top view according to arrow II in FIG. 1 of an indexable cutting insert as claimed in the invention with a palisade-like profile.
Figure 5:
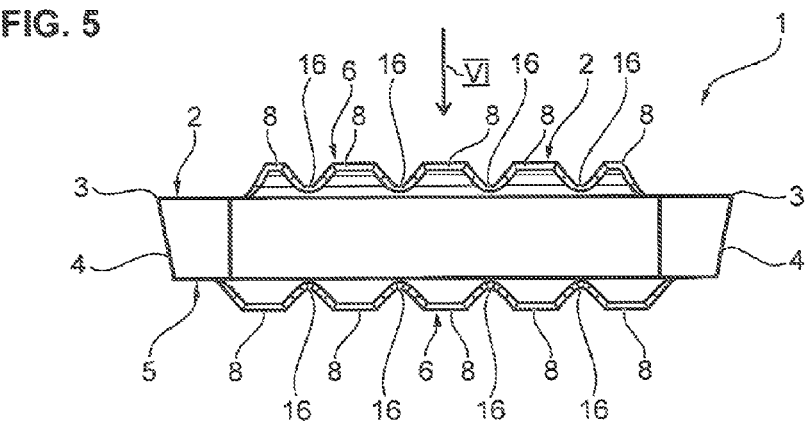
FIG. 5 shows a side view of an indexable cutting insert as claimed in the invention with a checkered profile produced by truncated pyramids.
Figure 6:
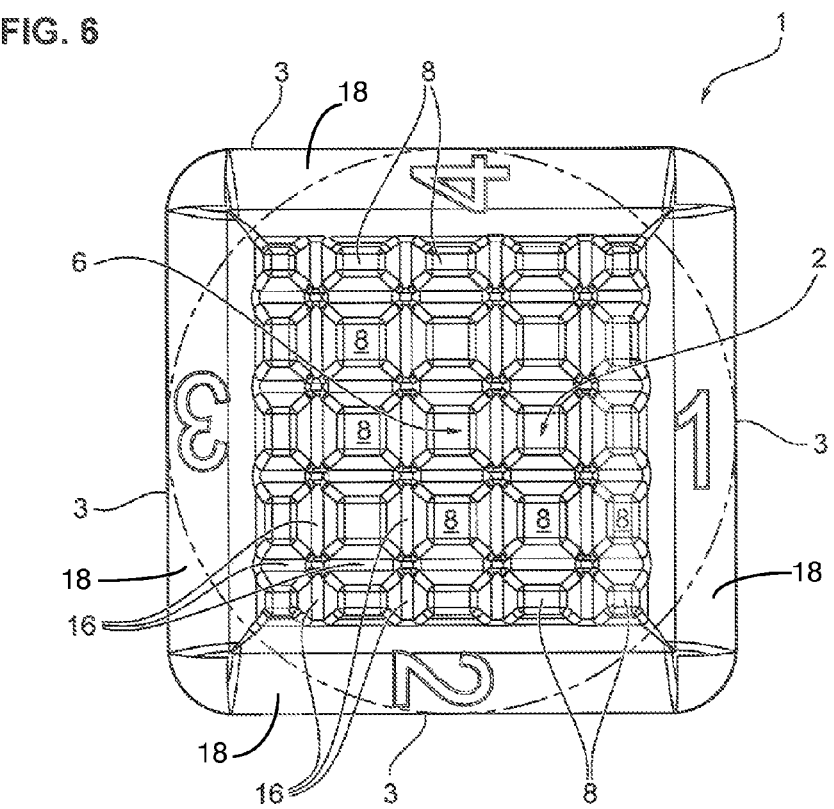
FIG. 6 shows a view according to arrow VI in FIG. 5 of an indexable cutting insert as claimed in the invention with a checkered profile produced by truncated pyramids.

FIG. 1 shows a side view of an indexable cutting insert 1 as claimed in the invention, FIG. 2 shows it in top view and FIG. 3 and FIG. 4, in each case, show it in a perspective view. In this case, this is an embodiment with a square basic form and a trapezoidal cross section. Two oppositely situated cutting edges 3, to each of which is connected a free surface 4 in the direction of the under surface 5 of the indexable cutting insert 1, are incorporated into the top surface 2 of the indexable cutting insert 1 shown in FIG. 2. A profile 6, produced from gripping strips 7 arranged in parallel with a trapezoidal cross section, is provided centrally in each case both on the top surface 2 and on the under surface 5. A planar rake face 18 is provided between the profile 6 and each cutting edge 3.

FIGS. 5 to 8 show an alternative embodiment of an indexable cutting insert 1 as claimed in the invention with four formed cutting edges 3 and free surfaces 4 connecting thereto in each case in the direction of the under surface 5. In the case of the exemplary embodiment in FIG. 5 to FIG. 8, the profile 6 is formed by a number of truncated pyramids 8 arranged next to each other in the manner of a chess board. The embodiment in FIG. 1 to FIG. 4 differs from the embodiment in FIG. 5 to FIG. 8 in that, in the case of the embodiment in FIG. 5 to FIG. 8, all four edges defining the body of the indexable cutting insert 1 are realized as cutting edges 3. In contrast, in the case of the exemplary embodiment in FIG. 1 to FIG. 4, only two opposite edges of the body of the indexable cutting insert 1 are realized as cutting edges 3. In this connection, in the case of the embodiment in FIG. 1 to FIG. 4, these are profiled cutting edges for producing a predetermined contour. The cutting edges 3 are used one after the other by rotating the indexable cutting inserts 1, in each case, by 180° (FIG. 1-FIG. 4) or by 90° (FIG. 5-FIG. 8).

Figure 9:
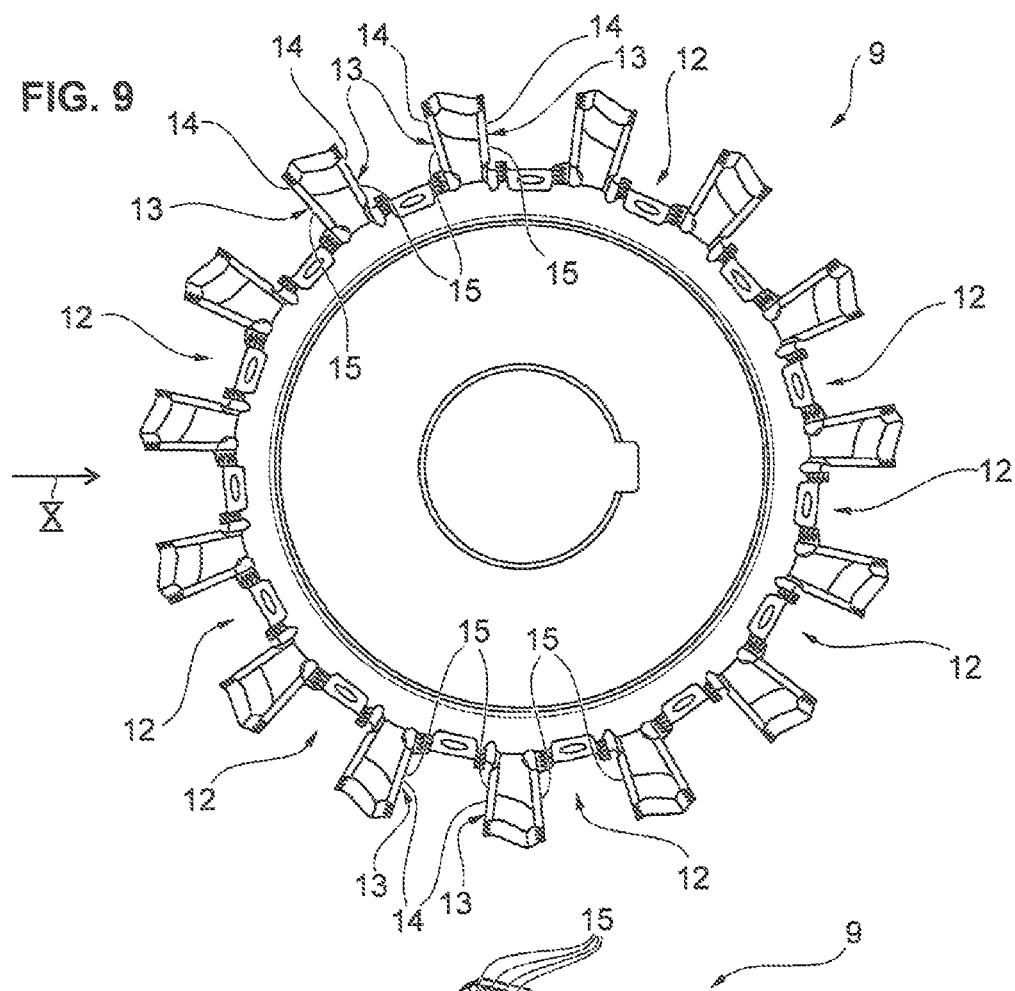
FIG. 9 shows a side view of a side milling cutter as claimed in the invention without indexable cutting inserts.
Figure 10:
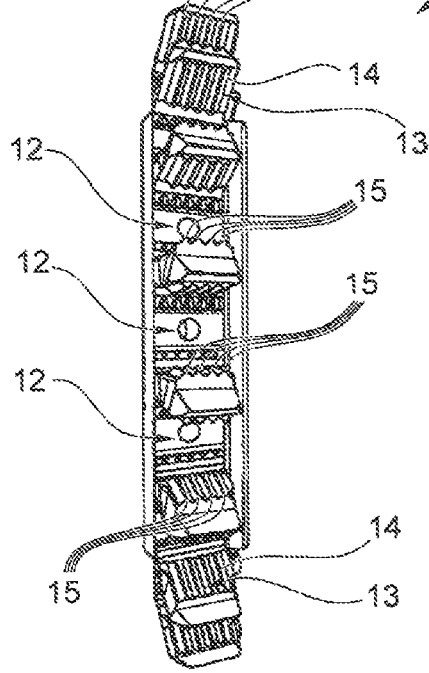
FIG. 10 shows a view according to arrow X in FIG. 9 of a side milling cutter as claimed in the invention without indexable cutting inserts.
Figure 11:
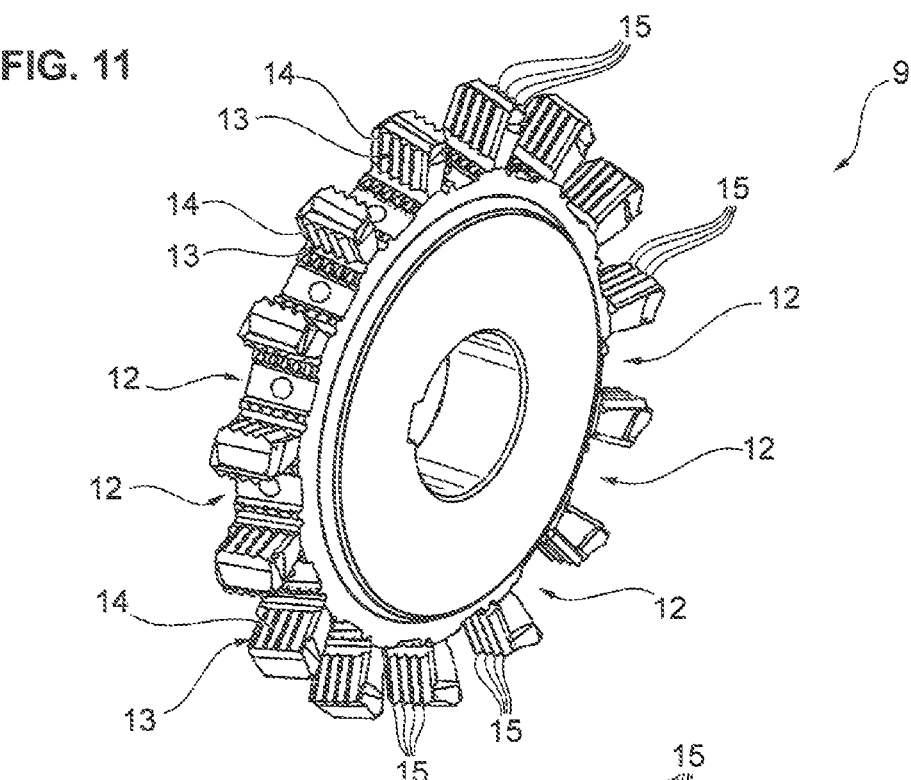
FIG. 11 shows a perspective view of a side milling cutter as claimed in the invention without indexable cutting inserts.
Figure 12:
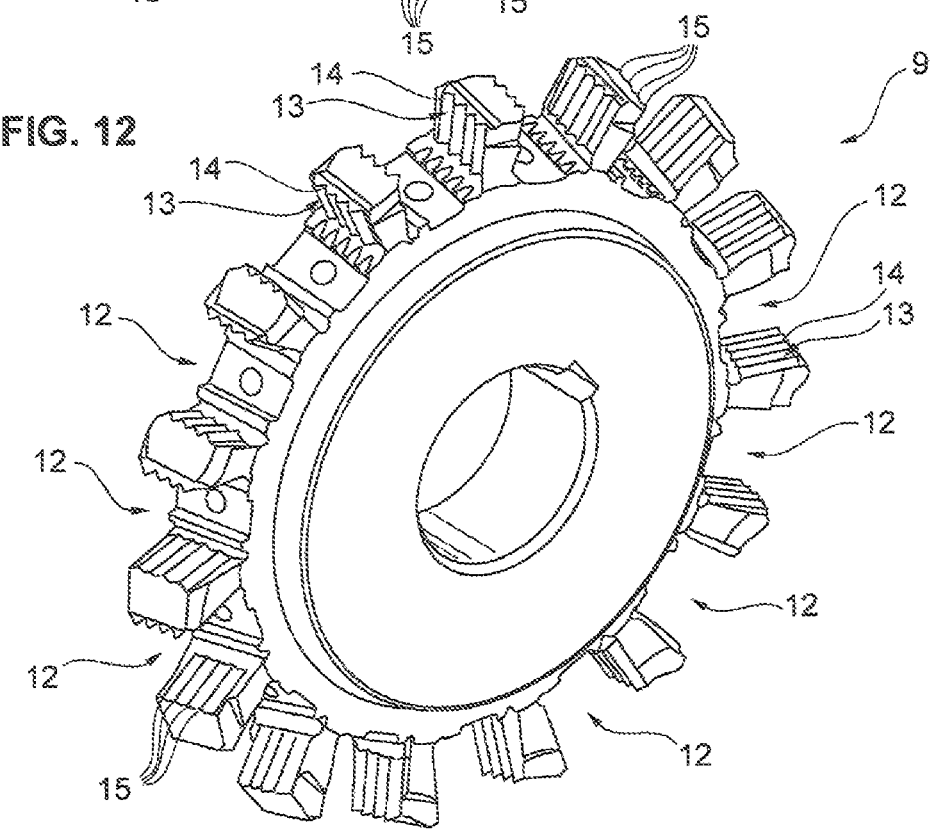
FIG. 12 shows a perspective view of a side milling cutter as claimed in the invention without indexable cutting inserts.
Figure 15:
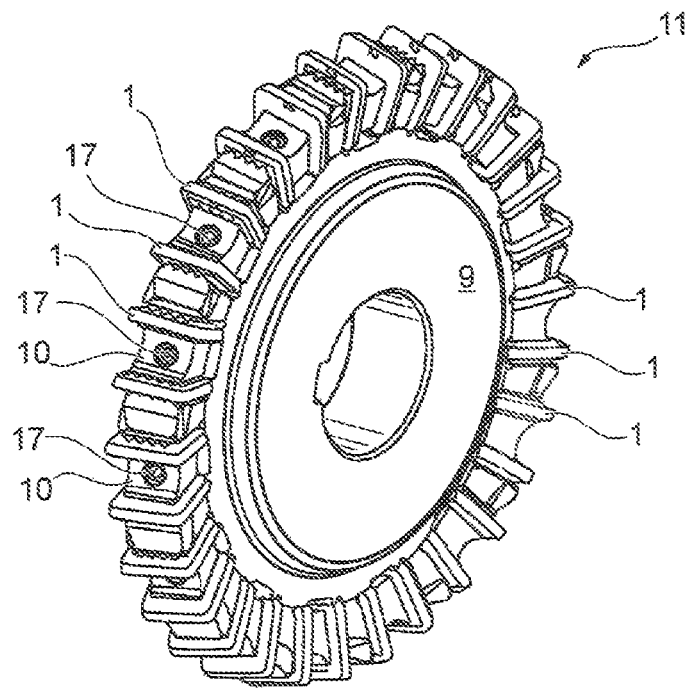
FIG. 15 shows a perspective view of a side milling cutter as claimed in the invention with inserted indexable cutting inserts and double clamping wedges.
Figure 16:
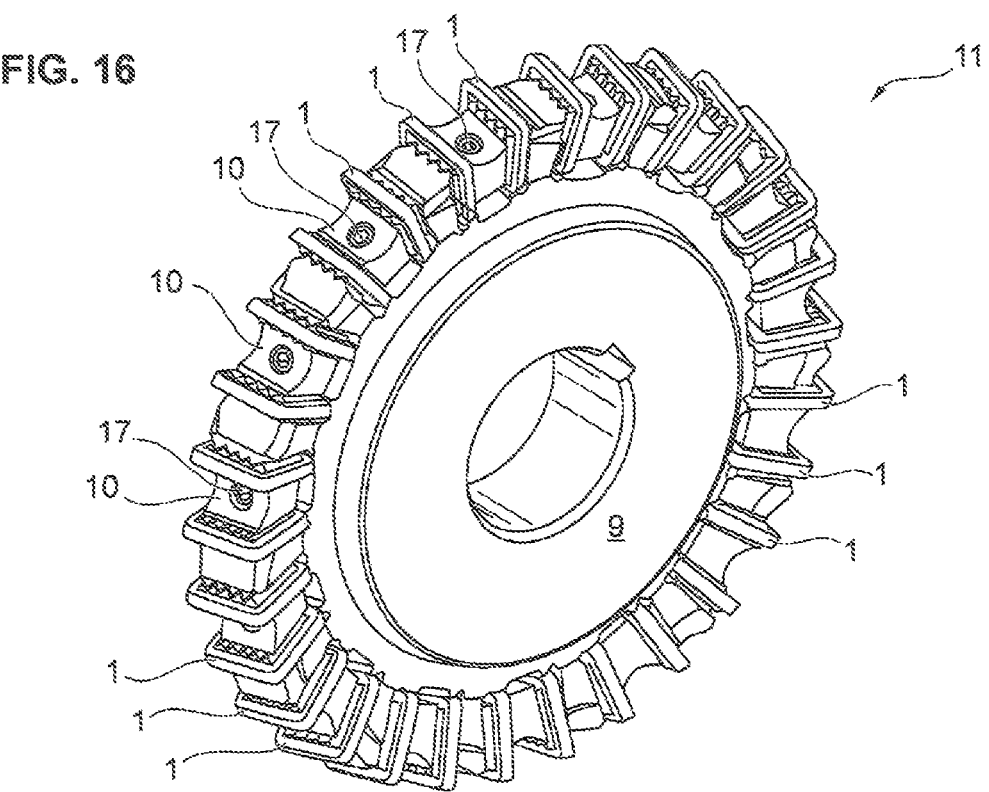
FIG. 16 shows a perspective view of a side milling cutter as claimed in the invention with inserted indexable cutting inserts and double clamping wedges.

FIG. 9 shows a view in the axial direction onto the support body 9, which is supplemented by the indexable cutting inserts 1 and double clamping wedges 10 lying between said indexable cutting inserts to form the side milling cutter 11. The support body 9 has receiving pockets 12, which are distributed over its periphery and are, in each case, for two indexable cutting inserts 1. The receiving pockets 12 form at their pocket flanks in each case an insert seat for an indexable cutting insert 1. For this purpose, each insert seat has a guide surface 13 which protrudes radially out of the support body 9. Each guide surface 13 supports a counter profile 14. The counter profiles 14, in the case of the exemplary embodiment, are in each case developed as V-shaped tooth strips 15.

The method of operation is as follows: with the indexable cutting insert 1 mounted, each V-shaped tooth strip 15 engages in the profile 6 in the body of the indexable cutting insert 1. On account of their trapezoidal cross section, two adjacent gripping strips 7 in each case form a V-shaped recess 16 between them. To form a positive lock, the V-shaped tooth strip 15 then engages in the V-shaped recess 16, which is associated therewith and realized in a complementary manner.

The same applies to the embodiment in FIG. 5 to FIG. 8. In this case too, truncated pyramids 8, which are arranged next to each other in the longitudinal direction, in each case form a V-shaped recess 16 between themselves. The V-shaped recesses 16 extend in the exemplary embodiment in FIG. 5 to FIG. 8, on the one hand, parallel to each other and are in each case intersected by further parallel-extending recesses 16 that are oriented at 90° in relation to them.

If FIG. 9 and FIG. 13 are looked at on the one hand, it can be seen that, in the final assembly state represented in FIG. 13, in each case one indexable cutting insert 1 abuts against the two guide surfaces 13 located opposite each other in each receiving pocket 12. A double clamping wedge 10 is incorporated in each case between said two indexable cutting inserts 1. Each double clamping wedge 10 is penetrated by a clamping bolt 17, which engages in the support body 9 of the side milling cutter 11 by way of its threaded end. The profiled side surfaces of each double clamping wedge 10 facing the indexable cutting inserts 1 and consequently effective as clamping surfaces are smooth and thus slide on the level end surfaces of the profiles 6, that is to say in the case of the exemplary embodiment in FIG. 1 to FIG. 4, on the end surfaces of the gripping strips 7 and, in the case of the exemplary embodiment in FIG. 5 to FIG. 8, on the end surfaces of the truncated pyramids 8.

Finally, FIG. 14 shows a side milling cutter with an insert seat inclined by a cutting angle α. In common with the insert seat, the indexable cutting insert 1 and its cutting edges 3 are also inclined by the cutting angle α.

The invention claimed is:

1. An indexable cutting insert for a side milling cutter having two insert surfaces facing away from each other and four cutting edges located at opposite ends of each of the two insert surfaces, and a planar free surface extending from each of the four cutting edges to the other one of the two insert surfaces, wherein both insert surfaces include a profile comprising a plurality of truncated pyramids arranged in a chess board pattern on the insert surfaces and including a first parallel row of a plurality of V-shaped recesses between the plurality of truncated pyramids and a second parallel row of V-shaped recesses between the plurality of truncated pyramids, the second parallel row of V-shaped recesses perpendicular to the first parallel row of V-shaped recesses, and wherein two cutting edges on opposite ends of each of the two insert surfaces are perpendicular to the first parallel row of V-shaped recesses, and wherein the other two cutting edges on opposite ends of each of the two insert surfaces are perpendicular to the second parallel row of V-shaped recesses, and wherein a planar rake face is provided between the profile and each cutting edge.

* * * * *